Figure 1:
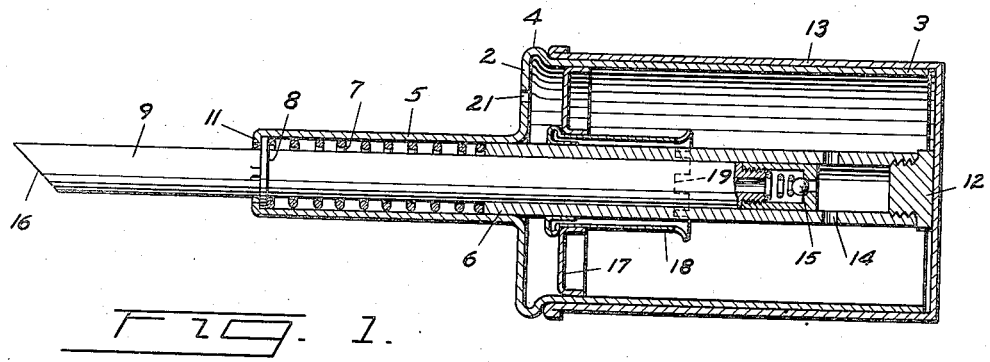

INVENTOR.
JOHN L. CREVELING
BY
ATTORNEY.

Patented Apr. 23, 1935

1,998,753

UNITED STATES PATENT OFFICE 1,998,753

LUBRICATING DEVICE

John L. Creveling, near Tucson, Ariz., assignor to The Lubrication Corporation, South Bend, Ind., a corporation of Delaware Original application February 24, 1932, Serial No. 594,785. Divided and this application January 15, 1934, Serial No. 706,593

7 Claims. (Cl. 221—47.4)

This invention relates to lubricating devices and more particularly to lubricating pumps of the type employing a pump assembly forming one unit of a lubricant dispensing apparatus or "gun", the lubricant container itself being arranged to provide the other unit, the two units when combined providing a complete and operative lubricant gun.

The very common and usual lubricant hand pump or lubricant hand "gun" comprises a pump and a lubricant reservoir more or less integrally connected with the pump, the reservoir being arranged to be filled by hand or by some instrument in the nature of a paddle or scoop or the like. Such "guns" are generally filled from containers in which the lubricant is supplied in bulk. The objections to such filling methods and instrumentalities are well known.

One of the primary objects of the invention therefore is to provide a lubricant pump unit capable of being associated with an original lubricant container to provide a completely operative lubricant gun of what may be termed a "self loading" type. The lubricant containers may be termed cartridges since they not only provide units necessary to the completion of the gun as a completely operative structure but dispense the lubricant through the gun pump unit directly to the part or parts to be lubricated.

Another object of the invention is to provide a compact and relatively cheap lubricant gun including the pump unit proper and the reservoir or cartridge unit.

Still another object of the invention is to provide an efficient hand operated lubricant pump capable of producing relatively high pressures.

A further object is to provide an arrangement whereby a pump of the ported cylinder type may be employed in a "gun" construction of the character described herein without material lubricant wastage.

Figure 2:
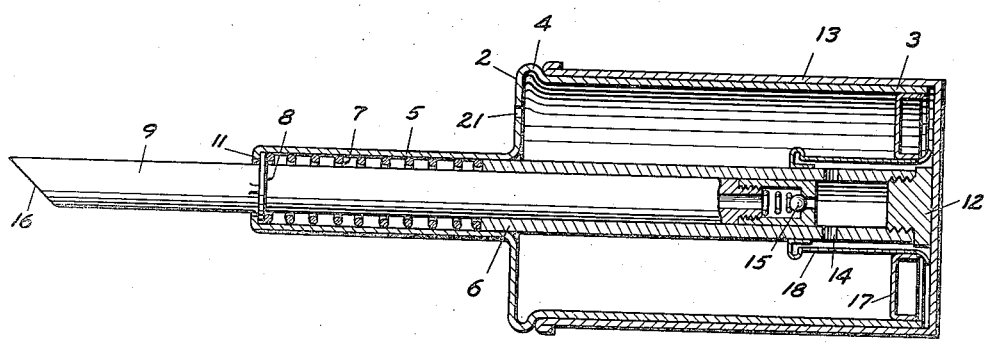

Still other objects, the advantages and uses of the invention and various species thereof should become apparent after reading the following description and claims and after viewing the drawing in which:

Fig. 1 is a view partly in section and partly in elevation showing a preferred form of the invention, and Fig. 2 is a view similar to that of Fig. 1, showing the position of certain of the parts when the lubricant container, reservoir or cartridge has been substantially emptied.

This application is a division of Creveling application Ser. #594,785 filed February 24, 1932 entitled Lubricating devices.

A casing generally designated 2 is formed to provide a cylinder 3, a shoulder 4 and a tubular portion 5 concentric with the cylinder 3. A tube 6 which forms the cylinder of a pump is secured at one end in the portion 5 of the casing and at that end provides one abutment for one end of a coiled spring 7 which, at its other end, abuts a collar 8 secured to a hollow pump plunger 9. The pump plunger 9 is adapted to reciprocate in the cylinder 6 within which it has a sliding fit and is retained therein against the action of spring 7 by the collar 8 which abuts the inturned end 11 of the portion 5 of the casing. The movement of the plunger 9 in the opposite direction may be limited by a plug 12 secured in and closing the bottom end of cylinder 6.

The plug 12 may also provide a support or an abutment for the bottom of an original or other lubricant container or cartridge 13 which is adapted to telescope over the cylinder 3 with a frictional fit when its cover (not shown) has been removed. When a container or cartridge 13 is telescoped over the cylinder 3 the lubricant is transferred to the space within the cylinder 3 from which it is drawn into the pump cylinder 6 through ports 14 on the suction stroke of the plunger 9. On a pressure stroke of the plunger 9 lubricant is forced past a spring loaded check valve 15 disposed in the inner end of the plunger through the hollow plunger and out of a nozzle 16 formed integral with the plunger.

In order to insure an even and continued flow of lubricant to the pump cylinder until the supply of lubricant in the container is exhausted, a follower 17 is disposed in the cylinder 3 and surrounds the cylinder 6 but, instead of being mounted upon the cylinder 6 for sliding movements therealong, is mounted to slide between appropriate abutments on a sleeve 18 which, in turn, is slidably mounted upon the cylinder 6. The sleeve 18 bears upon the cylinder 6 only at one end, the remainder of the sleeve being spaced from the cylinder 6 an appreciable though short distance radially thereof and over a length slightly greater (preferably) than the distance from the outer end of plug 12 to the side of ports 14 remote therefrom. The bottom end of sleeve 18 is provided with slots 19 for passage of lubricant therethrough and a vent 21 permits the follower to move back and forth in the cylinder 3 with the lubricant.

In operation, with the follower 17 and sleeve 18 in the positions illustrated in Fig. 2, (the positions occupied when a cartridge has been emptied of lubricant), the empty cartridge is removed and a new cartridge is prepared for use. As the filled cartridge is telescoped over cylinder 3 the lubricant is transferred to the cylinder and in so doing first slides the follower 17 along the sleeve 18 from its position shown in Fig. 2 to its position shown in Fig. 1, whereupon continued flow of lubricant into the cylinder causes the sleeve 18 to move to the position in which it is shown in Fig. 1. The cartridge then becomes a part of the "gun" and remains thereon until the lubricant charge has become exhausted. The operation of the "gun" is believed to be obvious and therefore will not be related.

While I have illustrated and described what is to be a preferred embodiment of the invention, it is apparent that the invention is susceptible of various other embodiments bearing little if any resemblance to that illustrated. Accordingly, I desire to be limited only by the spirit of the invention and the scope of the appended claims.

I claim:

1. In a lubricating device, a cylinder adapted to receive lubricant, a removable container telescopically mounted over said cylinder and forming a closure for said cylinder, a tube fixedly positioned within and extending throughout the entire length of said cylinder, said tube having a passage intermediate its ends providing communication between its interior and said cylinder, and a tubular pump plunger telescopically and slidably mounted in said tube.

2. A lubricating device comprising, a lubricant container, a cylinder telescoped within said container, a tube having one end within said cylinder and adjacent to the bottom of said container, said tube being formed with an inlet passage extending laterally therethrough adjacent to said end, a closure for the rear end of said tube, a tubular pump plunger telescoped within said tube and normally extending outwardly from the forward end thereof, a sleeve surrounding said tube slidably mounted thereon and having a length greater than the distance between said passage and the closed end of said tube, said sleeve being so arranged with respect to said tube as to provide free passage for lubricant in said tube inlet regardless of the position of said sleeve on said tube, and a follower surrounding said sleeve and slidably mounted thereon.

3. A lubricating pump comprising, a lubricant container, a tube positioned therein and formed with an inlet passageway intermediate its ends and having the rear end closed, a sleeve surrounding said tube and slidably mounted thereon, said sleeve being so formed as to provide free passage for lubricant in said container from the lower end of the container to said tube inlet regardless of the position of said sleeve on said tube, and a follower surrounding said sleeve and slidably mounted thereon.

4. A lubricating pump comprising, a tube formed with an inlet passage extending through the tube intermediate the ends, a closure for the rear end of said tube, a tubular plunger telescoped within said tube and normally extending forwardly from the front end thereof, a sleeve surrounding said tube and slidably mounted thereon having a length greater than the distance between said passage and the closed end of said tube, said sleeve being so arranged with respect to said tube as to provide free passage for lubricant between said sleeve and said tube to said inlet passageway regardless of the position of said sleeve on said tube, and a follower surrounding said sleeve and slidably mounted thereon.

5. A lubricating pump comprising, a lubricant container, a tube positioned within the container and formed with an inlet passageway intermediate its ends and having the rearward end of the tube closed, a sleeve surrounding said tube of greater length than the distance between said inlet passageway and the closed end of the tube, said sleeve having slidable engagement with said tube at its forward end and being spaced away from said tube throughout the remainder of its length whereby lubricant from the inner end of the container may pass between the sleeve and the tube to said inlet passageway, and a follower surrounding said sleeve and slideably mounted thereupon.

6. A lubricating pump comprising, a lubricant container, a tube positioned within the container and formed with an inlet passageway intermediate its ends and having the rearward end of the tube closed, a pump plunger slidably mounted in said tube and having a nozzle at its outer end, a sleeve surrounding said tube of greater length than the distance between said inlet passageway and the closed end of the tube, said sleeve having slideable engagement with said tube at its forward end and being spaced away from said tube throughout the remainder of its length whereby lubricant from the inner end of the container may pass between the sleeve of the tube to said inlet passageway, and a follower surrounding said sleeve and slideably mounted thereupon.

7. In a lubricating device, a cylinder adapted to receive lubricant, a removable container telescopically mounted over said cylinder and forming a closure for said cylinder, a tube fixedly positioned within and extending throughout the entire length of said cylinder, said tube having a passage intermediate its ends providing communication between its interior and said cylinder, a follower piston within said cylinder surrounding said tube mounted for movement longitudinally of the cylinder and tube, and a tubular pump plunger telescopically and slideably mounted in said tube.

JOHN L. CREVELING.